Nov. 21, 1933. M. M. BORDEN 1,936,537
AIR VACUUM VALVE COMBINED WITH AIR RELEASE VALVE
Filed Nov. 16, 1929
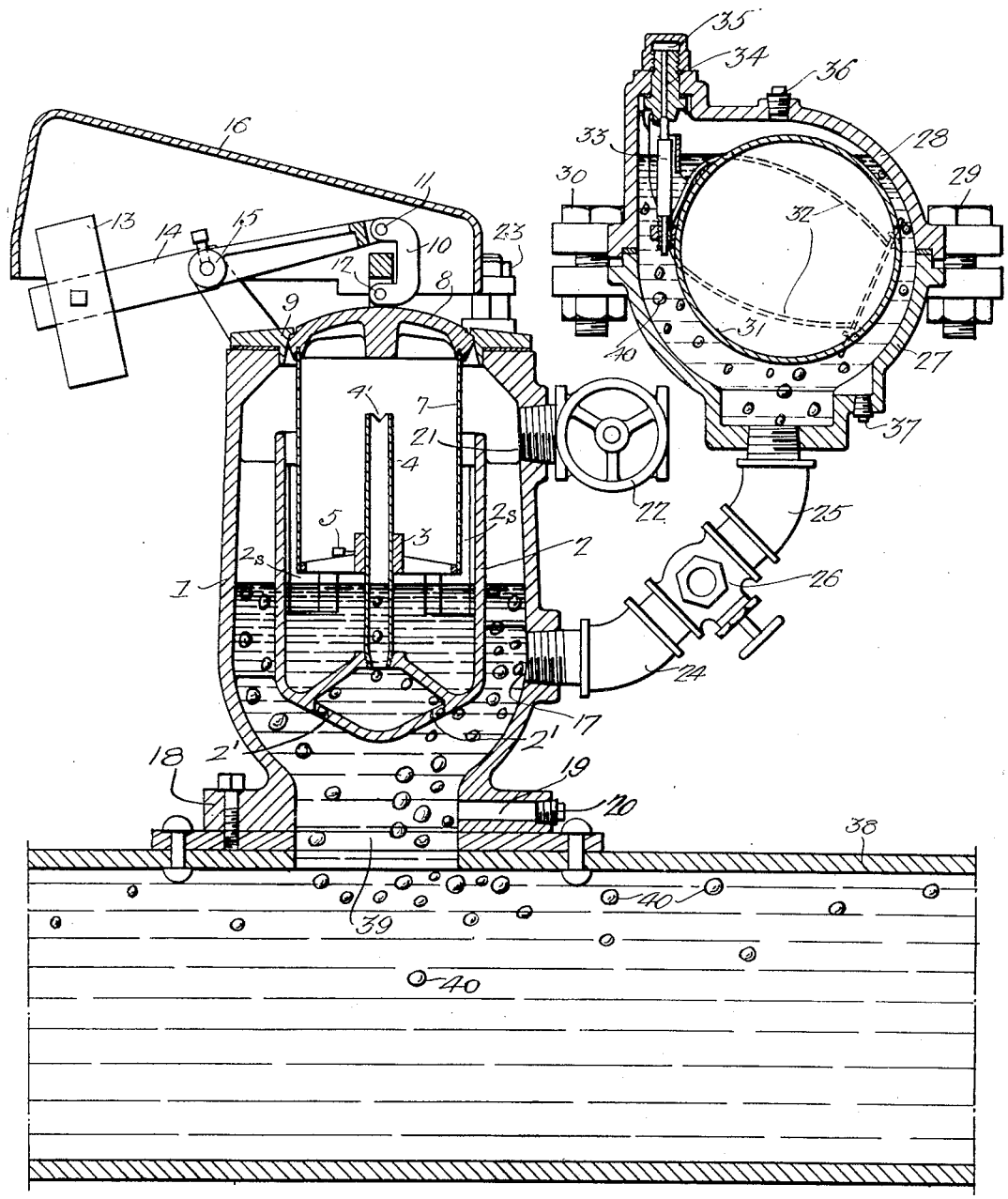
Inventor:
Moro M. Borden
by his Attorneys
Howson & Howson Patented Nov. 21, 1933

1,936,537

UNITED STATES PATENT OFFICE 1,936,537

AIR-VACUUM VALVE COMBINED WITH AIR-RELEASE VALVE

Moro M. Borden, Philadelphia, Pa., assignor to Simplex Valve and Meter Company, Philadelphia, Pa., a corporation of Delaware Application November 16, 1929
Serial No. 407,716

2 Claims. (Cl. 137—69)

This invention relates to improvements in devices capable of automatically breaking a vacuum which may occur within water pipe conduits or thin wall pressure vessels of any kind as a result of sudden drainage of water from such vessels and conduits and refers particularly to improvements in construction and operation of air-vacuum valves and further relates to the combination of such valves with devices for releasing accumulations of air in water pipe conduits generally termed air release valves.

The principal object of the invention is to construct an air-vacuum valve which will not stick when exposed to freezing temperatures.

Another object of the invention is to construct a valve in which there will be little or no tendency for water, snow or condensate to accumulate at the valve seat when exposed to the weather, thereby impairing its operation and efficiency.

A further object is to construct a valve in which the valve seat is at the highest point of the structure.

Another object of the invention is to construct the body of the valve of such a contour as to substantially eliminate the concave recess above the valve seat which is generally present in valves of the type described made in accordance with constructions of the prior art.

A still further object is to combine an air release valve integrally with an air-vacuum valve of the type described in order to eliminate a plurality of connections and simultaneously cause the air release valve to work more efficiently than if it were individually connected to a water pipe conduit.

Other objects will appear more fully hereinafter from the following detailed description together with the drawing, in which:

The single figure is a sectional view of the air-vacuum valve combined with the air release valve connected to a water pipe conduit.

Referring first to the construction of the air-vacuum valve, it comprises the valve body 1, which has cast integral therewith or otherwise attached thereto as desired, a baffle and seal 2, the function of which is to prevent the rapid egress of air from driving the valve to its closed position. The float 7 carrying the valve closure 8 is guided to the seat 9 by the guiding means comprising the hollow tube 4 and the sleeve 3. The sleeve 3 may be adjusted by the screw 5. The tube 4 is threaded at one end and provided with a notch 4' at the other end and is secured into place in the baffle 2. The baffle 2 is provided with holes 2' at the bottom thereof which facilitate the collection of air inside the float and the expulsion of water therefrom. This construction insures that water shall be entirely expelled from inside the float 7 during the normal operation of the pipe line while the valve is closed thus giving it its greatest measure of buoyancy and freedom from corrosive action. The baffle is also provided with slots 2s which are of considerable area and are so located as to allow a free inflow of water through the baffle in order to seal the air in the float and not permit the escaping air to enter the float and drive it to its seat. The float 7, which is in the form of a hollow cylinder, is made open at one end and consequently will trap air within it which will be but slightly compressed by the rise of water around the outside of the float. As a consequence, the float will be assisted to the seat 9 by the resulting buoyancy. Attached to the float valve by means of pins 11 and 12 and link 10 is a lever 14 pivoted at the fulcrum 15. The lever is provided with a counterweight 13 which is of such size and located at such a point as will insure the rising of the float carrying the valve 8 to its seat 9 after the water traps air within the float. The counterweight is adjustable on the lever 14, whereby it may vary the amount of water that must rise around the float for it to be buoyed to the seat. In this way, different degrees of balance of the float and speed of motion to its seat may be obtained. A guard cover 16 is supported on studs 23 which perform the additional purpose of holding the valve seat 9 to the body 1. The guard cover 16 protects the lever mechanism from being knocked out of adjustment from jars and prevents foreign material from accumulating around the mechanism. It also insures against tampering with the valve. The body of the valve is connected to a water pipe conduit 38 through the opening 39 and is attached to the conduit by means of a saddle 18 riveted to the pipe conduit 38. An opening 21 is provided near the top of the valve body for the reception of a valve 22 which is used for inspection purposes and testing of the valve. Another opening is provided at 17 for the reception of a coupling which leads to an air release valve which will be more fully described hereinafter. A third opening 19 is provided for the draining of the water from the valve by removing the plug 20.

The novel features of the construction of the air-vacuum valve are the location of the valve seat 9, which is at the highest point of the valve body and the contour of the valve head 8 which is so shaped that there is no recess formed at the top of the valve between the valve head and the valve seat, thereby substantially eliminating any possibility of water, snow, condensate and the like accumulating therein which, in freezing weather, would seal the valve, thereby impairing its operation and destroying its function. In air-vacuum valves of the prior art, the construction generally includes a guide member extending upwardly from the peripheral portion of the valve head which slides along a guiding surface extending downwardly and forming the valve seat several inches below the top of the valve body. The guide member forms a recess at the top of the valve head into which water, snow, condensate and the like may accumulate and freeze, thereby sealing the valve as hereinbefore mentioned. In my construction, the recess is eliminated by dispensing with the sliding peripheral guide member and raising the valve seat to the highest point of the structure, so that when the float with the valve head rises to the seat, the periphery of the valve head comes flush with the extreme upper portion of the valve seat and any water falling on the valve head will necessarily roll off, thereby preventing any accumulations. However, to prevent any water whatever from remaining on the valve head, it is given a coat of low freezing temperature grease which has no tendency to hinder the motion of the valve, but it insures the rolling off of the water therefrom.

Another novel feautre of my invention is combining integrally with the air-vacuum valve an air release valve, the purpose of the air release valve being to prevent the accumulation of air in the water pipe conduit. The air release valve comprises the two hemispherical portions 27 and 28 which are clamped together by means of bolts 29 and 30 to form a hollow spherical body. Inside the spherical body is provided a hollow glass sphere 31 which acts as a float and is attached to brackets 32 which, in turn, are connected to a needle valve 33 which operates to open and close the passage 34 to release air through the opening 35. The spherical body is provided with plugs 36 and 37 for draining the water therefrom and for testing purposes. The spherical body of the air release valve is connected to the air-vacuum valve by means of 45° L's 24 and 25 and the three-way valve 26. The purpose of the three-way valve 26 is to connect or disconnect the two valves to or from each other. It has been found that by combining the air release valve with the air-vacuum valve, it works more efficiently than if it were individually connected to the water pipe conduit 38. The reasons for this will be explained more fully hereinafter.

The operation of the combined device is as follows:—As the supply of water in the conduit 38 increases and the pipe is finally filled, the water rises into the body of the air-vacuum valve by means of the opening 39 and completely fills the interior thereof, sealing the open end of the flat 7 and causing it to rise assisted by the counterweight, thereby lifting the valve 8 to its seat 9 thus closing the valve so that no further air or water is discharged through it. The water also rises and enters the opening 17 and passes into the spherical body of the air release valve through the couplings 24, 25 and 26, thereby causing the float 31 to rise and causing the needle valve 33 to close the passage 34. If for any reason the supply of water should fail, the formation of a vacuum in the conduit is prevented by the action of the float 7 which is lowered along the guiding tube 4 because of the absence of water to keep it floating and as soon as it is lowered, the valve head 8 is lowered therewith and a supply of air is permitted to enter the body which instantly eliminates any tendency of a vacuum being formed. When the pipe system is full, there is a tendency of fair being accumulated in the system due to bubbles which are introduced into the system usually by pump leaks or valve leaks and the like where air may enter the system in small quantities. The accumulation of these bubbles is prevented by the action of the air release valve. The bubbles instead of continuing through the pipe conduit are by-passed by means of the relatively large opening 39 entering the body 1. Collecting in this body they depress the fluid level therein until finally this fluid level is at the opening 17, after which air bubbles are passed into the valve body of the air release valve where they accumulate near the top in sufficiently large quantities to cause an air pressure which lowers the water level and the lowering of the water level causes the float 31 to move the needle valve 33 downwardly, thereby releasing the accumulated air through the passage 34 in the opening 35. As soon as the air is released, the water again completely fills the upper portion of the body 28, the float rises and the needle valve 33 closes the passage 34, thereby preventing water from emerging from the opening 35. By combining the air release valve with the air-vacuum valve, fewer connections to the pipe conduit are required and because of the larger opening which connects the air-vacuum valve with the pipe conduit, a greater number of air accumulations or bubbles are caused to be by-passed than if the air release valve with its smaller opening were connected to the pipe conduit. Because of the greater number of air accumulations being by-passed through the opening 39, the system is more substantially free from trapped air and the air release valve is caused to function more satisfactorily. Attention is directed to the fact that valve 8, once it has engaged its seat, is firmly held thereagainst by pressure; at first the direct water pressure from the main 38 and finally this water pressure as applied through the air surrounding the valve. After air has accumulated in the body 1 to the level of the opening 17, valve 8 and its guides are freed from liquid surroundings which might freeze and cause the valve to stick. The valve is, thus, at all times free for instantaneous movement when necessity for such movement arises.

While I have shown only one embodiment of the invention for the purposes of illustration and description, it will be apparent to those skilled in the art that other changes and modifications may be made without departing from the scope of the invention and I, therefore, desire to be limited only by the scope of the appended claims.

I claim:

1. An air-vacuum valve for breaking a vacuum in water pipe conduits and the like comprising a hollow substantially cylindrical body, a valve seat mounted on the extreme upper portion of said body, a float comprising a hollow cylinder open at one end and having a convex closure at its other end, said closure being in cooperative relation with the valve seat to admit or release a supply of air to and from said body, a guiding means for said float, a baffle located inside of said body and surrounding the float for preventing the rapid egress of air driving said float to said valve seat, an adjustable balancing means pivoted at the top of said body and connected to said float whereby different degrees of balance and speed of motion of said float to the valve seat may be obtained, the closed end of said float being arranged to meet flush with the upper portion of said valve seat when air has been released from said body thereby presenting a surface which prevents the accumulation of water thereon, and a cover mounted on said valve body for protecting the balancing means and the valve seat from foreign material and against tampering therewith.

2. A device for breaking a vacuum in fluid conduits and the like comprising a hollow body communicating with the conduit and having an opening in its upper end, a buoyant member in the hollow body and having its upper end formed as a valve to close the opening of the hollow body, guiding means for said member disposed interiorly of the body, a counterbalancing means for said member disposed exteriorly of the body, and means for releasing air from the body having connection with the body at a point such that the liquid level in the body is maintained at a point below the lower end of said member.

MORO M. BORDEN.